(12) United States Patent
Stark et al.

(10) Patent No.: US 9,657,882 B2
(45) Date of Patent: May 23, 2017

(54) TUBULAR FILM AND THE USE THEREOF

(71) Applicant: Buergofol GmbH, Siegenburg (DE)

(72) Inventors: Kurt Stark, Neuhaus a.d. Pegnitz (DE);
Gregor Schleicher, Ingolstadt (DE);
Abdel-Kader Boutrid, Siegenburg (DE)

(73) Assignee: BUERGOFOL GMBH, Siegenburg (DE)

( * ) Notice: Subject to any disclaimer, the term of this patent is extended or adjusted under 35 U.S.C. 154(b) by 535 days.

(21) Appl. No.: 14/204,205

(22) Filed: Mar. 11, 2014

(65) Prior Publication Data

US 2014/0272231 A1    Sep. 18, 2014

(30) Foreign Application Priority Data

Mar. 11, 2013  (DE) .................. 10 2013 102 394
Aug. 21, 2013  (DE) .................. 10 2013 109 052

(51) Int. Cl.
*F16L 55/165*  (2006.01)
*B32B 1/08*  (2006.01)

(52) U.S. Cl.
CPC ............ *F16L 55/1656* (2013.01); *B32B 1/08* (2013.01); *Y10T 428/139* (2015.01)

(58) Field of Classification Search
CPC ............................... F16L 55/1656; B32B 1/08
See application file for complete search history.

(56) References Cited

U.S. PATENT DOCUMENTS

| | | | |
|---|---|---|---|
| 5,906,789 A | 5/1999 | Kamiyama et al. |
| 6,032,698 A | 3/2000 | Schwert et al. |
| 6,136,135 A | 10/2000 | Kamiyama et al. |
| 6,196,271 B1 | 3/2001 | Braun et al. |
| 6,251,995 B1 | 6/2001 | Hesse et al. |
| 6,270,289 B1 | 8/2001 | Einhaus et al. |
| 8,361,580 B2 | 1/2013 | Stark et al. |
| 2008/0226853 A1 | 9/2008 | Bueker et al. |
| 2009/0139593 A1 | 6/2009 | Papp |
| 2013/0074972 A1 | 3/2013 | Fuechtjohann et al. |
| 2013/0098495 A1 | 4/2013 | Fasel et al. |
| 2013/0126029 A1 | 5/2013 | Hummel |
| 2014/0076448 A1 | 3/2014 | Duttenhoefer |

FOREIGN PATENT DOCUMENTS

| | | |
|---|---|---|
| DE | 44 29 601 A1 | 2/1996 |
| DE | 101 12 265 A1 | 11/2002 |
| DE | 10 2005 025 597 A1 | 4/2006 |
| WO | WO 95/29361 | 11/1995 |
| WO | WO 98/12465 | 3/1998 |

OTHER PUBLICATIONS

German Patent Office Search Report, Nov. 11, 2013.
German Patent Office Search Report, Mar. 21, 2014.
German Patent Office Search Report, May 29, 2015.

*Primary Examiner* — Michael C Miggins
(74) *Attorney, Agent, or Firm* — Dority & Manning, P.A.

(57) ABSTRACT

A tubular film with one or more layers is provided, wherein at least one of the two external sides of the tubular film has a coating at least in sections with at least one polysiloxane and/or a coating and/or covering with at least one migrating compound.

13 Claims, 2 Drawing Sheets

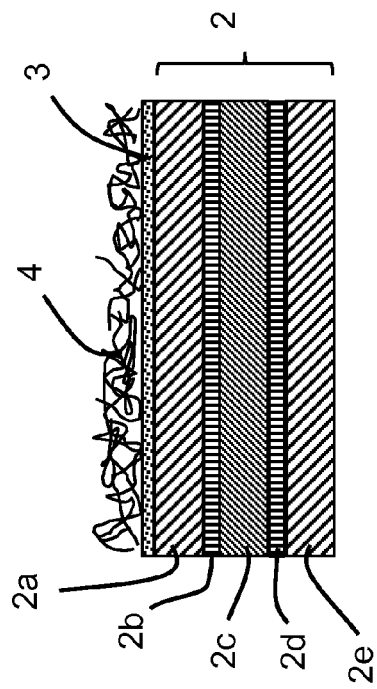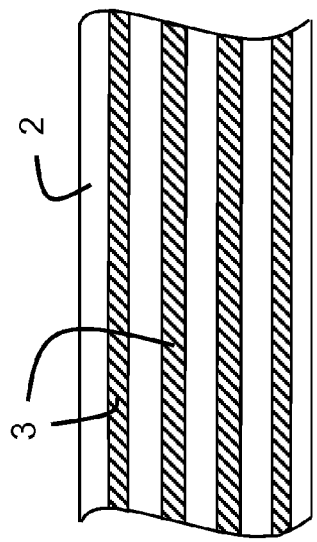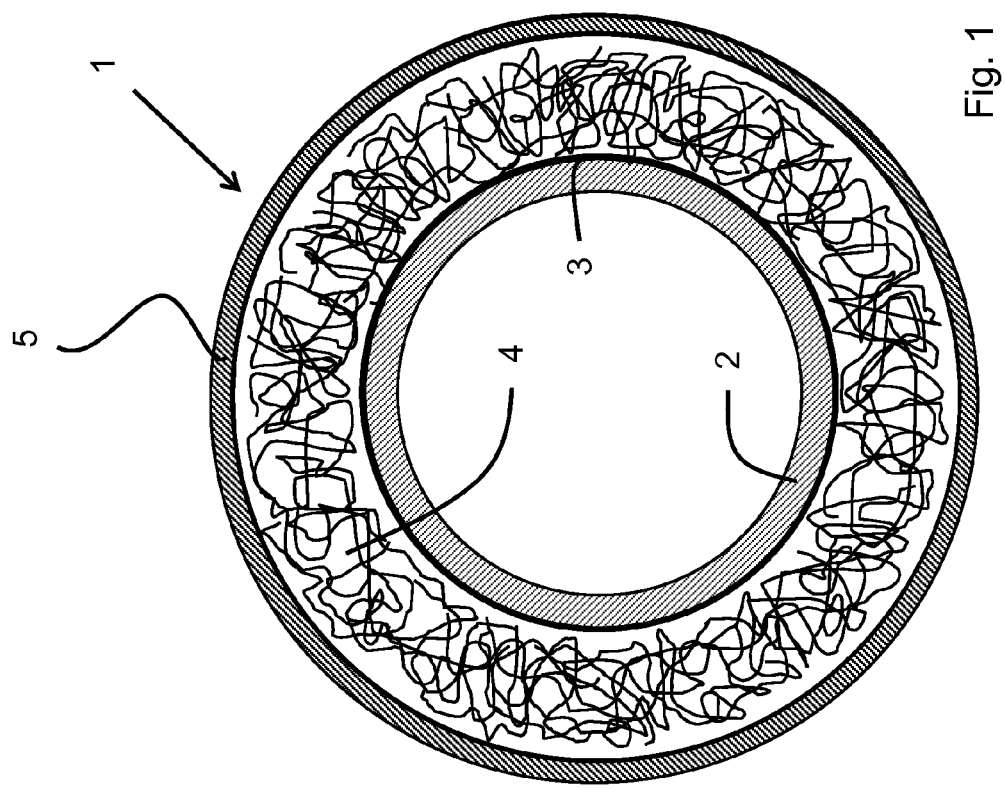

TUBULAR FILM AND THE USE THEREOF

FIELD OF THE INVENTION

The invention refers to a tubular film with one or more layers.

BACKGROUND

The scope of application of tubular films that have, for example, one olefin homo- or copolymer layer such as a polyethylene (PE) layer and a polyamide (PA) layer, for example, is very big. Apart from the packaging industry, one of the areas in which they are used is in the tube lining process for trenchless sewage pipe renovation. Here, it is known from the glass fiber tube liner system that uses UV or steam curing, for example, that a thick-walled PE film having a high density (HDPE—high density polyethylene) is introduced as sliding film, which is—at least in the cross-sectional form of a half circle—positioned tightly against the inner wall of the pipe. Afterwards, a flexible insertion tube executed as tubular film tube is introduced into the pipe (drawing-in process) and the insertion tube slides over the sliding film. This, on the one hand, prevents the tube's inner wall or objects inside the pipe from damaging the insertion tube, and on the other hand considerably lowers the friction generated between the insertion tube and the sliding film, thus facilitating the drawing in of the insertion tube.

In the glass fiber tube liner system cured with UV or steam, such an insertion tube (tube liner) typically has an external tube (outer tube film) executed as tubular film and an internal tube (inner tube film) executed as tubular film. Between them, a carrier material (e.g. glass fibers) impregnated with reactive plastic resin is introduced. Some of the reactive plastic resins used are, for example, commercially available UP resins (polyester or unsaturated polyester resins), VE resins (vinyl ester resins) or EP resins (epoxy resins). UP or VE resins are cured, for example, with the help of photoinitiators, but also thermally. Once inside the pipe, the insertion tube is inflated from the inside with compressed air against the mechanically stable inner tube film until the outer tube film presses tightly against the pipe's inner wall or the sliding film so the resin can be cured afterwards—for example with UV light from a UV light source being slowly pulled through the interior of the inflated insertion tube. Finally, the inner tube film of the insertion tube is pulled out and removed. To do this, a good release effect is necessary so the inner tube film can be pulled out without residues from the cured resin. The layer with the carrier material is then exposed to the substances to be guided through the pipe.

To prevent an unintended, premature curing of the plastic resin before insertion into the pipe to be renovated (particularly during storage), it is necessary for the outer tube film of the insertion tube to have or be made from a protective layer to prevent UV radiation or shorter wavelength radiation of visible light to affect the resin and thus to prematurely harden it. On the other hand, the inner tube film of such an insertion tube must be highly permeable to UV radiation and shorter wavelength radiation of visible light to make the curing process possible—in which a radiation source acts on the tube liner inflated inside the pipe when pulled along the interior of the tube liner, i.e. inside the inner tube film.

Instead of the sliding film described above—and especially in the plastic fiber-tubular film system with warm water or steam curing—a preliner (also known as preliner film) is introduced into the pipe to be renovated. The preliner, typically made of high density polyethylene (HDPE), is a thick-walled film that lines the pipe completely and also prevents direct contact of the tube liner with the pipe's inner wall. To do this, the preliner is placed directly against the pipe's inner wall. Afterwards, the pipe liner is drawn in (drawing-in process) or inverted (inversion process). The preliner prevents, for example, the plastic resin of the tubular liner from adhering to the sewer channel and the still unhardened resin from touching dirt and water. Furthermore, the preliner film also prevents resin from escaping out of the sewer renovation system and contaminating the soil and groundwater. The preliner film also protects the feeds from penetrating excess resin so no resin plugs and obstructions can form. In the drawing-in process, a preliner can also take over a similar function as the sliding films described above used for the pipe liner to be drawn in. In this case, the low coefficients of friction occurring between the sliding film or the preliner and the external film of the pipe liner are essential. As a result of this, the insertion tube or pipe liner is not damaged by the pipe's inner wall or objects inside the pipe when it is drawn into it; on the other hand, the friction between pipe liner and sliding film or preliner is very low and insertion drawing-in of the pipe liner is facilitated.

According to the former description, it is important during drawing-in in the glass fiber tubular liner system, for example, for the coefficient of friction of the internal side of the preliner or sliding film to be very low when moving against the outer film of the tubular liner.

Going back to the tubular liner and, in particular, to its inner tube film, a disadvantage of the PE/PA or PE/AP/PA film (AP: adhesion promoter) used so far as inner tube film mentioned above is its excessively low release effect against adhesive resins. In the worst case scenario, a poor release effect of the inner tube film when pulled out of the cured tubular liner causes the inner tube film to tear off owing to excessive adhesion to the resin because it cannot be removed fully without leaving a residue. The film fragments are thus left behind inside the sewer pipe and can then either block it or act as interfering substances. Regarding their release effect towards resins or adhesive substances, the inner tube films known to date are, by and large. in need of improvement.

In addition, the mechanical properties of state-of-the-art PE/PA or PE/AP/PA films used as inner tube films such as their (continued) tear resistance & strength, elasticity, splicing tendency, impact resistance or puncture resistance can still be potentially improved. Something similar occurs with other known tubular films.

SUMMARY OF THE INVENTION

A task of this invention is therefore to make a one- or multilayered film, particularly a multilayered film, available to meet the strict requirements made to its mechanical stability and with an outstanding release effect against adhesive substances such as resins—which is the case, for example, in trenchless sewage pipe renovation. Additional objects and advantages of the invention will be set forth in part in the following description, or may be obvious from the description, or may be learned through practice of the invention.

In the films according to the invention, it came as a surprise to discover that a good release effect against adhesive resins is also accompanied by a reduction of the coefficients of friction of film against film. Such a result was unexpected.

Moreover, the tubular films according to the invention shaped like tube liners have outstanding mechanical properties in addition to very good separation against resins. When an inner tube film is used in trenchless sewer renovation, a bursting of the inflated inner tube film is virtually ruled out. Furthermore, the tubular film according to the invention can also be used as tube-shaped sliding film or preliner. In this case, the excellent mechanical properties have proved highly advantageous and minimized interference. Generally speaking, the film according to the invention can be used for all kinds of sewage pipe renovation, including GFP (glass fiber-strengthened plastic) with UV resin curing, inversion and thermal curing.

The advantages of the invention can be especially seen in that the films according to the invention have outstanding mechanical properties such as very high elasticity, low tendency to splice, sturdiness, resistance and puncture resistance. They virtually rule out a bursting of the films.

Specifically, it was found out that the one-layered films according to the invention (particularly for preliners or sliding films) or multilayered films (especially for preliners, sliding films, calibration or inner tube films) are characterized by high mechanical and very good elasticity (determined according to the air inflation test method described below) without the splicing of a layer. Advantageously, if the multilayered film according to the invention is used as inner tube film in the tube lining process, it exhibits an elasticity until "splicing" (i.e. a first tear in the interior film layer) of at least 15%, especially advantageously of at least 20% and even more advantageously of at least 30%. The elasticity until bursting is preferably at least 80%, better if it is at least 100%, more advantageous if it is at least 120%, even more advantageous if it is 130% and even more so if it is at least 140%.

An important parameter associated with elasticity is the so-called yield point (i.e. the stretching limit). Up until that point, force increases with the elasticity, but once the yield point is exceeded, the film starts flowing and the force starts decreasing once again as elasticity increases or at least remains constant.

To adjust the advantageous properties of the tubular film according to the invention to the degree desired, they can only be provided on a portion of the circumferential area of the external side in question (the external side facing inwards or outwards) in the case of a coating according to the invention. If, for example, the force necessary for separating the tubular film from an opposite surface should lie within a desired force range (i.e. not be too easy or difficult to detach), the coating can be available as pattern or be applied, for example, in form of continuous and/or interrupted strips running separately beside one another—for example and conveniently in md (machine direction), i.e. the direction of the machine and therefore of the tube. A striated coating with strips running parallel in md (i.e. in longitudinal direction of the tube) is feasible, relatively easy and therefore advantageous. Strips, points, circles or other shapes crossing one another can also be chosen for a sectional coating, however.

An only partial (i.e. sectional) coating is also advantageous if it overlays the laying edges that run in longitudinal direction to the left and right of the tubular film that occur when the tubular film is occasionally rolled up. These laying edges occur both on the inner and outer external side of the tubular film and are potential weak points when the tubular film is stretched, as is the case while inflating it, for example. By coating the laying edges on at least one of their two external sides (the inner and/or outer one), stretching until splicing can be raised. It is advantageous if the coating is applied on the corresponding outer side of the two laying edges because it can be done more easily with a machine. Other circumferential areas of the tubular film may not need a coating.

A multilayered film according to the invention can especially be used for sewage pipe renovation as inner tube film, supporting and calibration film, sliding or preliner film with a layer structure consisting of three, four, five or more layers. In this case, three-layered, four-layered, five-layered or even higher layered inner tube films can be used, but according to a preferred alternative of the invention at least one of the external sides of the tubular film according to the invention is coated with at least one polysiloxane.

According to another preferred alternative, at least one wax, paraffin, fatty acid, fat and/or another migrating, preferably lipophilic—but in other embodiments alternatively hydrophilic—compound is contained in at least one of the two outer layers. A coating with these substances is also possible.

Within the meaning of this invention, the term "polysiloxane" refers to compounds whose polymer chains are built up of alternating silicon and oxygen atoms (polysiloxane is known colloquially by the name of "silicon" too). The silicon atoms are linked to their neighboring silicon atom by one, two, three or four oxygen atoms. In a polysiloxane, a mono unit (M) is formed by a silicon atom linked with three residues (R) and one oxygen atom. These are always the terminal groups of polysiloxane. A di unit (D) is formed in a polysiloxane by one silicon atom linked with two residues R and two oxygen atoms. These are generally the inner monomer units of polysiloxane that constitute one linear silicon. In a polysiloxane, a tri unit (T) is formed by a silicon atom bound with a residue R and three oxygen atoms. Most of the time, these are inner monomer units of polysiloxane that lead to branching. In polysiloxane, a quarter unit (Q) is formed by a silicon atom that is bound with four oxygen atoms. They are mostly inner monomer units of polysiloxane that lead to very extensive branching or to a cross-linking of the silicon. Therefore, the structural formula of polysiloxane is based, for example, on recurrent siloxane units (—[Si$(R_2)$—O]—)$_n$, that are—in each case and regardless of one another—substituted with two organic residues R and thus bring about the silicon's linear chain structure without branching. The number n of the recurrent siloxane units [Si$(R_2)$—O]—)$_n$ in the polysiloxane chain receives the name of degree of polymerization of polysiloxane.

Preferably, at least one polysiloxane is cross-linked or cured. Here, the cross-linking takes place mostly by special residues R along the polysiloxane chain that have a chemical function such as, for example, a double bond (e.g. vinyl group, allyl group, (meth)acryl group), a silane group Si—OR, a hydrogen atom
—H or an epoxide group. The respective polysiloxanes can be polysiloxanes cross-linked by the action of an addition, condensation, radicals, cations and humidity. In the polysiloxanes cross-linked by addition, they are preferably metal catalyzed additions. It is also possible to cure thermally, electromagnetically (especially with UV radiation) or with humidity. The corresponding methods are known to the specialist.

The use of mixtures from several polysiloxanes is possible for the coating according to the invention.

For example, for adjusting the release effect more accurately, the polysiloxane is copolymerized with monomers that do not contain silicon according to advantageous embodiments. Such copolymers are also known under the term "polysiloxane" within the meaning of this invention. The additionally incorporated monomers cross link neighboring siloxane units with one another and fill spaces among them. Basically, as more additional monomers without silicon are incorporated, the release effect is reduced. For example, the monomers that do not contain silicon are incorporated through copolymerization with (meth) acrylates or vinyl ethers.

Alternately or additionally, the release effect in a polysiloxane coating can be adjusted by choosing the length of the polysiloxane chains and the degree of branching. The release effect can also be influenced by appropriately choosing the residues R mentioned above—particularly regarding their length. The release effect is somewhat weaker with shorter chains, whereas longer chains allow easier separation. However, the aim could also be to obtain a not too easy release of the polysiloxane-coated film to prevent premature detachment.

Siloxane coating on at least one of the external sides of the film according to the invention has preferably a maximum layer thickness of 15 μm, very preferably a maximum of 5 μm and even more preferably from 0.1 μm to 3 μm.

In the coating alternative with a migrating compound, the latter is incorporated in that outermost layer of the one- or multilayered film to whose external side the migrating compound should migrate. This migration to the surface of the outer (or only) layer is time-dependent, of course. The exposed coating of the corresponding external side with the aforesaid migrating compound is caused by this migrating movement. Also, alternately or additionally, a coating with the migrating compound can be done on the external side in question. Naturally, if there is only one single coating with the migrating compound, the migration-related time component does not have to be considered.

The migrating compound has preferably a molecular weight lower than 10,000 g/mol, better if it is less than 5,000 g/mol, even better if it is less than 2,000 g/mol and ideally if it is less than 1,000 g/mol.

As implied above, wax is used according to an advantageous embodiment of the migrating compound. The term "wax" is understood to stand for many chemically different compounds that can be kneaded up to 20° C., are solid to brittle hard, have a coarse to fine crystalline structure, with color shining all the way to opaque, not glassy, melt above 40° C. without decomposing and slightly liquid (low viscous) just above the melting point. In addition, their consistency and solubility strongly depend on temperature and can be polished under slight pressure. According to the definition of the German Fat Science Society (DGF), a substance is no wax if it does not have more than one of the properties listed above, as stipulated in the DGF single method M-I 1 (75). Especially advantageous waxes are selected from the group comprising fatty acids, fatty alcohols, long-chain amines, fatty acid esters, fatty acid amides and surfactants.

According to some advantageous embodiments, a lipophilic compound can be selected for a migrating compound from a group that comprises:

Fatty acids, preferably C7-30-alkyl and C7-30-alkenyl fatty acids;
Fatty alcohols, preferably C7-30-alkyl and C7-30-alkenyl fatty alcohols;
Long-chain amines, preferably C7-30-alkyl and C7-30-alkenyl amines;
Fatty acid esters, fatty acid amides and surfactants, preferably cationic, anionic, non-ionic and amphoteric surfactants having a softening or melting point under normal pressure of at least 30° C., preferably at least 50° C., better at least 80° C., even better at least 100° C., and ideal at least 120° C.

The hydrophilic compounds that can be especially used are polyethers, polyesters or alcohols with at least one hydroxyl group. Advantageously, a compound from the group that comprises ethylene glycol, polyethylene glycol, polypropylene glycol, propanediol, butanediol, pentanediol, hexanediol and glycerin can be selected.

According to an advantageous embodiment, the at least one migrating, lipophilic or hydrophilic compound can be added to an external side containing a thermoplastic olefin homo- or copolymer or according to another advantageous embodiment, to an external side containing a homo- and/or copolyamide.

The proportion of the at least one migrating, lipophilic or hydrophilic compound in the layer in question is preferably at least 0.1% by weight, more preferably at least 0.5% by weight and even more preferably at least 1% by weight.

According to an advantageous variant, the at least one migrating compound can be a short-chain compound or an oligomer with 1 to 50 carbon atoms and according to another advantageous variant, a shorter-chained polymer with 50 to 20,000 carbon atoms. Regarding the migrating compound, however, the invention is not only restricted to organic compounds. Other suitable migrating compounds are also inorganic compounds such as short-chain polysiloxanes (with 1 to 500 silicon atoms) or (sheet) silicates such as talc, for example.

According to an advantageous embodiment of the invention, the tubular film has at least one layer that contains preferably a thermoplastic elastomer (TPE) preferably in at least more than 20% by weight, very preferably more than 40% by weight and up to 100% by weight. According to an advantageous embodiment, the TPE can be thermoplastic polyurethane (TPU), i.e. a urethane-based thermoplastic elastomer (also known as TPE-U). Examples of this are Desmopan, Texin and Utechllan made by Bayer. More examples are the commercially available products sold under the trade names of Elastollan, Estane, Morthane, Pellethane, Pearlthane, Skythane or Tecoflex. Other TPE substances can also be advantageously used, in which case—apart from TPU or TPE-U—the following groups are differentiated: TPE-O or TPO=olefin-based thermoplastic elastomers, mainly PP/EPDM, e.g. Santoprene made by AES/Monsanto; TPE-V or TPV=olefin-based cross-linked thermoplastic elastomers, mainly PP/EPDM, e.g. Sarlink made by Teknor Apex, Forprene made by SoFter; TPE-E or TPC=thermoplastic polyester elastomeres/thermoplastic copolyesters, e.g. Hytrel made by DuPont or Riteflex made by Ticona; TPE-S or TPS=styrene block copolymers (SBS, SEBS, SEPS, SEEPS and MBS), e.g. Styroflex made by BASF, Septon made by Kuraray or Thermolast made by Kraiburq TPE; and TPE-A or TPA=thermoplastic copolyamides, e.g. PEBAX made by Arkema. TPE silicon made by Wacker and available under the brand name Geniomer, can also be used. Geniomer® is a copolymer made of polydimethylsiloxane and urea that combines the good processing characteristics of an organic thermoplast with some typical silicon properties. Thus, Geniomer® has a property profile that in this form had neither been feasible in thermoplasts nor in silicones.

The utilization of TPE gives the tubular film according to the invention even better mechanical properties such as sturdiness, resistance and puncture resistance coupled with relatively low self-stiffness. This is especially the case when the tubular film according to the invention contains a homoor copolyamide in an external layer with a weight proportion expressed as percentage of more than 25% by weight, preferably more than 50% by weight, especially preferably more than 75% by weight or even more than 95% all the way to 100% by weight.

The film thickness of the coating and/or covering of the tubular film according to the invention is preferably no more than 15 µm, better if no more than 5 µm, and especially preferable if it is between 5 nm and 3 µm in case of a covering and between 0.1 to 3 µm in case of a coating.

The total thickness of the tubular film according to the invention can be from 10 µm to 5000 µm, preferably from 20 µm to 1000 µm, and even better if it is between 30 µm and 500 µm.

A preferred embodiment of the tubular film according to the invention has a layer succession made up of at least two layers, whereby an external layer facing inwards and an external layer facing outwards is foreseen. In addition, it is advantageous, but not necessary, if there is at least one internal layer as adhesion promoter layer.

A corresponding example in a multilayered configuration of the tubular film according to the invention allows for an external layer with at least one homo- and/or copolyamide and the other external layers with at least one thermoplastic olefin homo- or copolymer; in this case, at least one of the two external layers has the aforesaid coating and/or covering. Internal adhesion promoter layers can be provided resulting, for example, in a PA/AP/PE layer succession.

Another example would be a tubular film in which both external layers contain at least one thermoplastic olefin homo or copolymer, in which there is one internal layer containing a homo- and/or copolyamide and one of the two external layers has the aforesaid coating and/or covering in the outer side. Internal adhesive promoter layers can be provided, resulting in a layer succession of PE/AP/PA/AP/PE, for example.

A three-layered tubular film according to the invention can therefore have a PE/AP/PA layer succession, for example, and a five-layered film a layer succession of PE/AP/PA/AP/PE, PA/AP/PE/AP/PE or PA/AP/PE/PE/PE or PA/AP/PA/AP/PE, a seven-layered film, for example can have a layer succession of PE/PE/AP/PA/AP/PE/PE, PA/AP/PE/PE/PE/PE/PE or PA/AP/PA/AP/PE/PE/PE or PA/AP/PA/AP/PA/AP/PE.

The PA layer(s) can be made of the same or different PA material; PA mixtures are preferred too. Further details are given below. If there are two PA layers, an adhesive promoter can be incorporated, but it is also possible to work without adhesive promoter. The use of (conventional) adhesive promoters is preferred.

At least one homo- and/or copolyamide can be used for manufacturing the layer of the tubular film according to the invention. Suitable homo- or copolyamides are preferably selected from among the group of thermoplastic aliphatic, partially aromatic or aromatic homo- or copolyamides, which can be made from diamines (e.g. aliphatic diamines with 2-10 carbon atoms, especially hexamethylenediamine, and/or aromatic diamines having 6-10 carbon atoms, especially p-phenylenediamine) and/or from aliphatic dicarboxylic acids and/or aromatic dicarboxylic acids with 6-14 carbon atoms (e.g. adipic acid, terephthalic acid or isoterephthalic acid) and/or from lactamen having 4-10 carbon atoms (e.g. from ε-caprolactam).

Preferably, PA 6; PA 11; PA 12; PA 66; PA 6,10; PA 6,12; PA 666; PA 6I; PA 6T or the respective copolymers or mixtures from at least two of the polyamides mentioned are used.

The layer thickness of the layers of the tubular film according to the invention that contain at least one homo- or copolyamide is preferably between 5 µm and 100 µm, and very preferably between 20 µm and 90 µm.

To manufacture one or several layers of the tubular film according to the invention that has at least one thermoplastic olefin homo- or copolymer, the ones having α,β unsaturated olefins with 2-10 carbon atoms are preferred. For this, the following ethylene homopolymers (polyethylene, PE), preferably LDPE (low density polyethylene ranging from 0.86 to 0.93 g/cm$^3$), LLDPE (linear low density polyethylene), HDPE (high density polyethylene ranging from 0.94 to 0.97 g/cm$^3$) and mPE (based on metallocene catalysts polymerized PE), propylene homopolymers (polypropylene, PP), butylenes homopolymers (polybutylene, PB) and isobutylene homopolymers (polyisobutylene, PI) or mixtures from at least two of the polymers mentioned are used.

If there is at least one thermoplastic olefin homo- or copolymer in one or several layers of the tubular film according to the invention, its layer thickness or its added layer thicknesses preferably amount to at least 15% of the total layer thickness of the tubular film, very preferably to at least 25% and extremely preferably to between 30% and 60%.

To manufacture adhesive promoter layers of the tubular film according to the invention executed as multilayered film, conventional adhesive promoters can be used. If a modified thermoplastic polymer is used for the adhesive promoter layer(s), then the olefin homo- or copolymers mentioned above, in particular, can be used, but with appropriate modification.

Accordingly, at least one modified olefin homo- or copolymer is used, in which case the modification preferably takes place with at least one organic acid or preferably with at least one cyclic organic acid anhydride, preferably with maleic anhydride. The layer thickness of the adhesive promoter(s) of the multilayered film according to the invention is preferably between 1 µm and 30 µm, very preferably between 2 µm and 20 µm.

In the aforementioned layers, which preferably contain at least one homo- or copolyamide or at least one thermoplastic olefin homo- or copolymer, these compounds contain a proportion by weight expressed as percentage of more than 25% by weight.

As already mentioned above, it was surprisingly found out that the tubular film according to the invention is characterized by very good mechanical properties. Thus, for example, siliconization (coating with polysiloxane) of the tubular film leads surprisingly to a clear improvement of the mechanical values with regard to splice formation and elongation at break.

When underground pipes are renovated, the tubular film according to the invention is therefore able to withstand very well the occurring stresses, particularly when inflating it in the pipe system. This also applies to the mechanical stresses that the film is exposed to during transport. It was furthermore determined that the tubular film used as inner tube film is sufficiently tear resistant if it is peeled off from the resin/carrier system after the resin has cured, something that is supported a great deal by the excellent release effect according to the invention. Thus, the inner tube film can be peeled off without leaving a residue and no film fragments are left in the renovated sewage pipe. Moreover, the tubular film according to the invention has a good barrier effect against the drying up of the aforementioned resin if used as inner tube film.

The most varied additives can be added to a one-layered film according to the invention or to at least one of the two external layers of a multilayered film according to the invention—while preserving the release effect—such as, for example antioxidants, anti-blocking agents, anti-fogging agents, antistatic agents, active antimicrobial ingredients, oxygen scavengers, light protection agents, UV absorbers, UV filters, dyes, color pigments, stabilizers, preferably heat stabilizers, process stabilizers and UV and/or light stabilizers, preferably based on at least one sterically hindered amine (HALS), process aids, fire retardants, nucleation agents, crystallizers, preferably crystallization nucleus formation agents, lubricants, optical brighteners, flexibilization agents, sealants, softeners, silanes, separators, fillers, peel additives, wetting agents, surface-active compounds, preferably surfactants, and dispersants. The proportion of additives in the layers can be at least 0.01-20% by weight, preferably at least 0.1-10% by weight (refers in each case to the total weight of one single layer).

In a preferred embodiment, the tubular film according to the invention is not only at least partially permeable to UV radiation, but additionally—for the same reason as above—at least partially permeable to short-wavelength visible light (i.e. electromagnetic radiation in a 400 to 500 nm wavelength range, preferably 400 to 450 nm), preferably at least 80%, very preferably at least 90%. As a result of this, the tubular film according to the invention is especially suitable as inner tube film of a pipe liner during pipe renovation, because in this case UV radiation from UV light penetrates the inner tube film and can cure the resin.

For this reason, the tubular film according to the invention is mostly preferred as inner tube film with good release properties, but also preferred for use as supporting or calibration film for pipe liners or as sliding or preliner film in trenchless sewage pipe renovation, likewise in tubular form. Since owing to the coating according to the invention, the corresponding film surface also has better sliding properties, said coating and/or covering in a sliding or preliner film can be provided on the side facing the tubular film, so that when the latter is drawn in or turned inside out only very low shearing forces act on the external hose of the tubular liner.

Within the scope of this invention, a calibration hose is a hose whose function corresponds largely to the one of an inner tube film in the UV-/light-curing glass fiber liner system. After or at the same time the synthetic fiber felt impregnated with thermally reactive resin is installed in the sewage pipe to be renovated, it is positioned in a form-fitting way inside the pipe with the help of a calibration hose, which can therefore be a "blank" film shaped like the tubular film according to the invention. Alternatively, the calibration hose is a combination of a synthetic fiber felt with either a coating (mostly TPU) or a film. In this case, the latter then corresponds to a "pipe-in-pipe" system. If a calibration hose is used, the sequence would then be, for example, as follows: Pipe wall outside, then—if needed—a preliner film, then an external film of the pipe liner or coating, then the carrier with synthetic fibers and resin impregnation (constitute the outer pipe), then synthetic fibers with, if need be, resin plus coating or film (constitute the calibration hose as inner pipe). The above-mentioned films adjacent to the synthetic fibers can be the tubular films according to the invention. By filling the calibration hose from the inside with water, pressurized air, etc., the synthetic felt liner having the carrier is positioned in the pipe to be renovated. In this case, the curing of the resin takes place from the inside too, for example through hot water or water vapor.

Advantageously, the tubular film according to the invention—especially if it is an inner tube film or calibration hose—has an oxygen barrier layer, preferably an EVOH layer, a water vapor barrier layer and/or an oil barrier layer.

The invention also refers to an insertion tube for insertion into an underground pipe, especially a sewage pipe, for its renovation. The insertion tube comprises a one- or multi-layered film according to the invention impermeable to liquids as internal tube (inner tube film shaped like an insertion tube) and an external tubular film impermeable to liquids (outer tube film) that faces the pipe's wall. Between the inner and outer tube, a carrier material, preferably glass fiber material, has been provided that is preferably impregnated with a reactive unsaturated resin curable through UV radiation. After hardening, the renovated sewage pipe is formed from this impregnated carrier material. The internally positioned insertion tube according to the invention, advantageously executed as multilayered film, is pulled off and out of the sewage pipe lined with carrier material after hardening, which is the reason it can be easily separated from the cured resin. This process supports the coating and/or covering on the external side of the inner tube film facing the resin-carrier system according to the invention. The manufacturing of insertion tubes is described in general terms in WO 2007/054350 A1 or EP 1 155 256 B1.

The external tubular film can have one or multiple layers. Preferably, it can absorb and/or reflect UV radiation and/or visible light having short wavelengths as well as be either opaque or at least contact transparent. Furthermore, the external tubular film at least absorbs and/or reflects contact transparent UV radiation and/or short-wavelength visible light. Such an external tube is described in WO 2010/075946 A1 and DE 10 2010 023 764 A1, wherein this external tube has advantageously the ingredients and properties described there.

Materials preferably used as carriers between the external and internal tubular films are woven glass fibers, synthetic fiber felts (like needle felts, for example), fleece and/or non-woven textile products or textiles (like knitted hoses, for example) that in each case are impregnated with at least one reactive plastic resin, preferably in each case with at least one unsaturated polyester resin (UP resin) and α,β-unsaturated monomers, such as styrene, for example. Corresponding examples are glass fiber-strengthened plastics (GFP). Other resins that can be used are EP and VE resins apart from UP resins.

Other fields of application of the tubular film according to the invention pertain to its use as packaging material for the so-called non-food sector or for food, especially as lid and/or bottom film, as shrink wrap or skin film, as film for so-called bag-in-box packaging or as tubular bag. Additionally, the tubular film according to the invention can be used as release or release film against sticky substances and also as surface-protecting film or for protective suits, as covering film, agricultural film or as dirt-resistant tubular film in the construction industry.

The invention also refers to a method for manufacturing the separating film according to the invention. Preferably, the film according to the invention is manufactured through extrusion, preferably through blown film extrusion, to become a tubular film or through co-extrusion, preferably blown film co-extrusion, to become a tubular film. These manufacturing methods and the corresponding parameters are generally known to the specialist. At least one of the two coated external sides of the film according to the invention available as tubular film is coated with a polysiloxane as an alternative to the method according to the invention, wherein a mixture of at least one uncured polysiloxane and at least one cross-linkable additive (and possibly additives) are used. Through the action of heat and/or electromagnetic radiation and/or humidity—if need be by adding at least one UV or photoinitiator and/or one radical starter into the mixture—the coating is then cured in at least one external side of the aforementioned. These techniques are known to the expert.

When coating the tubular film according to the invention with polysiloxane, the following approach can be taken: First of all, the (co-)extruded tubular film is rolled up and transported to the coating machine. According to the methods typically applied, the tubular film is then spread out flat, allowed to breathe if need be, and a coat of still uncured polysiloxane applied on one of its sides, on its upper side, for example. After it has cured, the other surface is coated with still uncured polysiloxane, followed in turn by a hardening of these new layers. After the two-sided coating and drying, the tubular film is rolled up again.

Alternatively, the coating of the two flat sides of the tubular film can be performed in one single step.

An alternative method according to the invention is characterized by laying the tube flat and, while still uncoated, turning it in the circumferential direction of the tubular film either before putting it in the coating machine or while in it, so that the former edges of the tubular film resulting from the initial rolling-up (immediately after manufacturing) are no longer on the side of the edge. In other words, the tubular film is turned at an angle, preferably 90° C., so that one of the original edges is now arranged on the upper or front side and the other original edge is now arranged on the lower or back side of the tubular film laid out flat so the original edge areas resulting from the initial rolling-up can be fully coated.

This method creates the advantage that the edges resulting from the first roll-up, which have a very narrow bending radius and therefore can cause tears in the tubular film when exposed to high stresses in their expanded, round state, can be coated. As has been determined in the tubular film according to the invention, the coating improves the mechanical properties, so that these weak spots located on the original edges are eliminated or reduced and therefore "healed". Although the turning of the tubular film around its own longitudinal axis (i.e. in circumferential direction) causes new edges, they are a lot less kinked and stressed than the original ones when they are turned and introduced into the coating and when the tubular film itself is coated. For this reason, there is basically no damage if these new edge areas are not coated or less coated than the two flat sides of the tubular film laid flat.

In addition, it is possible to re-coat the non-coated areas in the coating machine.

Stamping, stretching, conditioning (reversible absorption of humidity, preferably of water, by a thermoplastic plastic material such as homo- or copolyamide or the entire tubular film) and/or printing the tube film according to the invention can be advantageous. On the other hand, the tube film according to the invention is preferably not oriented. It is better if the tube film according to the invention is transparent for use as inner tube film.

BRIEF DESCRIPTION OF THE DRAWINGS

The figures show various embodiments of the invention in a schematic way:
FIG. 1 a tube liner in cross section;
FIG. 2 a cross section through the inner tube film of the tubular film according to FIG. 1;
FIG. 3 a side view of an inner tube film with coating applied in stripes.

DESCRIPTION

Figure 5:
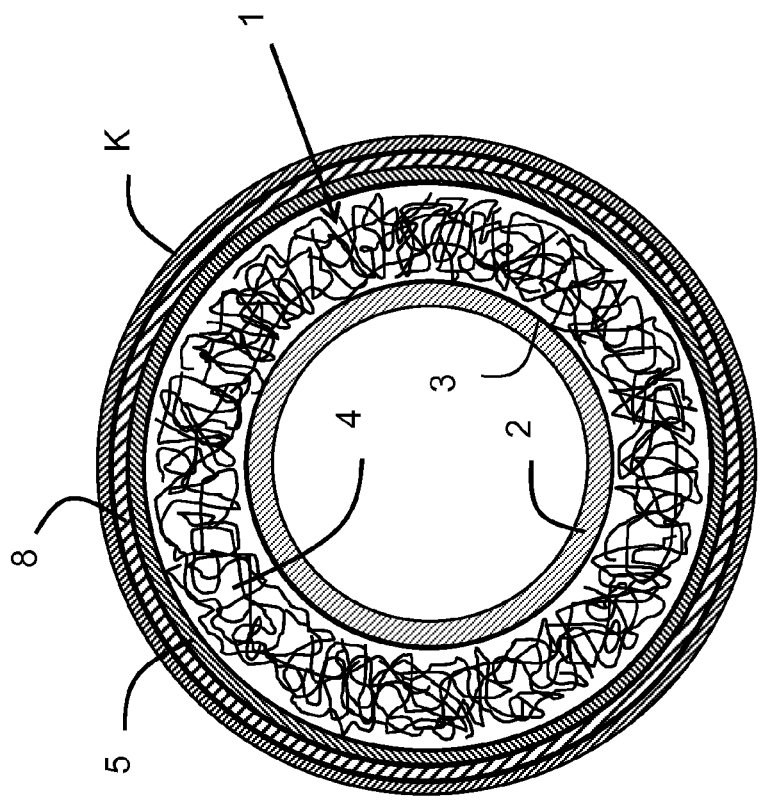

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a tube liner 1 in inflated state in order to line a sewage pipe K (see FIG. 5) to be renovated. The tube liner 1 has an inner tube film 2, a resin carrier system 4 and an outer tube film 5. This structure of a tube liner has been known for a long time, for example from DE 10 2010 023 764 A1. The layer structure and components are additionally described in more detail above.

Here, the inner tube film 2 has the layer structure PE/AP/PA/AP/PE and FIG. 2 shows the corresponding layer succession, shown with reference signs 2a/2b/2c/2d/2e. Alternative five-layered structures or also three- or seven-layered ones are listed above. According to the invention, the inner tube film 2 has here, on its external side facing the resin carrier system 4, a coating 3 covering the entire surface with at least one polysiloxane, see FIGS. 1 and 2. The term "polysiloxane" also includes mixtures from one or several polysiloxanes with additives and/or polysiloxanes copolymerized with monomers that do not contain silicon. We refer here to the explanations given above. The coating according to the invention, on the one hand, facilitates the peeling off of the inner tube film 2 from the resin carrier system 4 after UV has cured the resin inside the sewage pipe. On the other hand, it has been shown that the inner tube film 2 becomes more resistant, something important when the tube liner is inflated inside the sewage pipe. The higher tensile strength, resistance to puncture and elasticity, as well as the lower tendency to splice, lead to less damage to the inner tune film than with known inner tube films.

The behavior is similar when a covering or coating with migrating compounds is provided in addition to the above-mentioned polysiloxane coating or instead of it.

FIG. 3 shows an inner tube film 2 from the side of the resin carrier system 4 (not shown). Here, the coating 3 has been applied in stripes to prevent premature detachment of the inner tube film 2 from the resin carrier system 4. This could occur if the corresponding release forces would be too low. In other words, only a sectional application of the coating (or analogously to the covering) can optimize the release force—even if this occurs at the expense of mechanical resistance.

Figure 4:
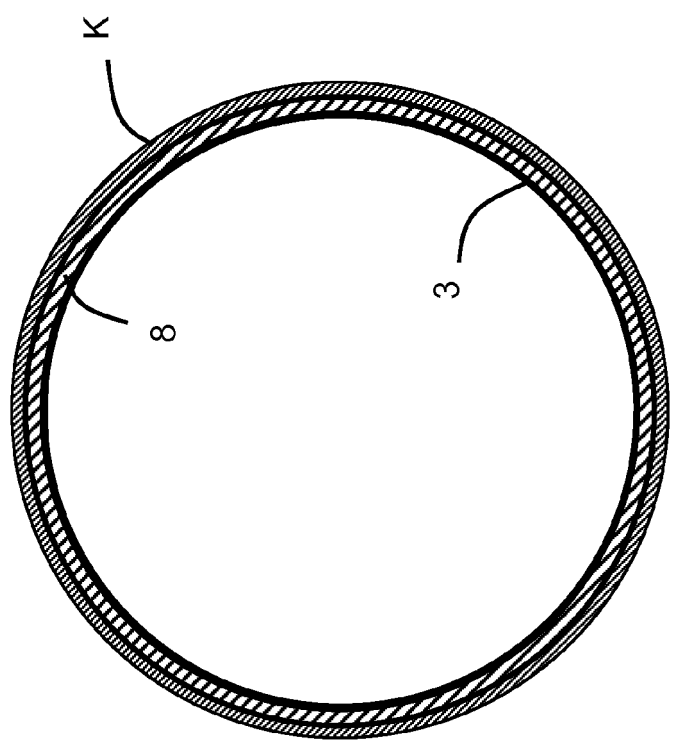
FIG. 4 a sewage pipe to be renovated with a preliner (sliding tube), in cross section, and
FIG. 5 a sewage pipe to be renovated with a preliner and the tube liner in accordance with FIG. 1, in cross section.

FIG. 4 shows a sewage pipe K with a preliner (also named sliding tube) in cross section. The preliner 8 can be made, for example, from an HDPE mono film or a multilayered film. On the side of the preliner 8 that faces the interior of the sewage pipe, according to the invention, a coating 3 (or a covering), either continuous or interrupted (for example striated) is provided. As a result of this, the sliding friction is reduced when a tube liner 1 is drawn in.

FIG. 5 shows the installed tube liner 1 in a sewage pipe K that has been lined with a preliner 8. The inner tube film 1 (FIGS. 1 and 2) and/or the preliner 8 (FIG. 4) can have the coatings 3 mentioned above. Shown is a coating 3 on the external side of the inner tube film 2 that faces the resin carrier system 4.

The embodiments shown in the figures refer to coatings with at least one polysiloxane. In principle, the respective statements made with the corresponding figures apply to a coating and/or covering with at least one migrating compound.

I. Testing Methods

1. Determination of Release Force (Release Effect)

To determine the release effect of the tubular film according to the invention against an adhesive applied on an adhesive strip, its separating force is calculated and indicated using the unit [cN/cm] or [cN/25 mm]. The release force is the force necessary for removing (i.e. separating) the release film from the adhesive. Here, the release force compared to an adhesive is similar to the release force compared to a sticky resin.

For the experimental determination, a test adhesive tape (width: 25 mm) is glued over the entire width of a sample of the tubular film according to the invention (or a comparative film). The sample is cut in such a way that in each case, a non-glued 1-cm edge of the release film protrudes on the long side of the test adhesive tape. The entire sample width is 4.5 cm (1 cm+2.5 cm+1 cm). The sample is then cut into several approx. 30-cm long stripes and the sample stripes are then stored at room temperature for 15 minutes. Afterwards, the side of the sample stripe that does not have the test adhesive tape is inserted by means of a double adhesive tape into a metallic rail (350×40 mm) of an electronically-controlled tearing machine fixed in place with a lower tension clamp. A stiff, approx. 400-mm long film strip is attached to the test adhesive tape and fixed in place on the tearing machine with an upper tension clamp. The test adhesive tape is now pulled off at an angle of 180° and with a pulling-off speed of 1800 mm/min. A force diagram serves to record the release force determined. In each case, an average of 3 measures is calculated.

2. Determination of Adhesion of the Coating to the External Layer

The adhesion of the coating to the external layer of a tubular film according to the invention is tested as follows: A tubular film sample is placed on a smooth base so that the coating points upward. Then, a finger is used to rub vigorously four to five times over the surface of the coating.

The adhesion of the coating to the external layer is assessed as follows:

Test OK (test all right)=no partial (or full) detachment of the coating.

Rub-off=partial (or full) detachment of the coating.

3. Testing Methods & Instruments for Friction, Air Inflation Test, Splicing and Break To determine the elasticity of the comparative example film V1 and of the various multilayered films according to the invention shaped like tubular films (i.e. examples B1-B6), air inflation tests were carried out.

As preparation, a 5 m long tubular film with a tube circumference of 1175 mm to 1180 was hermetically sealed on both ends by two metal disks. To achieve an airtight seal, tension belts and commercially available woven cloth adhesive tape were used—as is customarily the case in such air inflation tests. Through a valve in one of the two metallic disks, pressurized air was led into the tubular film until it burst. Before bursting, tears in the inner film layers (known as splices) were recognizable. From them, an exclusively localized bubble started forming in the multilayered film, which—as the air inflation process continued—developed to a tear in the tubular film that led to its bursting. The maximum elasticity value (expressed in percent) was determined by measuring the spot with the outermost circumference of the tubular film until it burst and comparing it with the initial tube diameter. The following formula was used:

Maximum elasticity=[(tube diameter after inflation/initial tube diameter before inflation)−1]·100

A similar formula was applied for the "film splice", i.e. the first recognizable tear of a layer of the tubular film (without affecting the entire tube):

"Splice"=[(tube diameter after inflation and first recognizable layer tear/initial tube diameter before inflation)−1]·100

For the subsequent tests, the films were stored in a standard climate for 24 hrs.

The testing device for the sliding friction was the BETEX Slipping Tester RK2 with a load cell of 10 N. A LINSEIS L120 E recorder was used. Two film pieces were stressed with a load (1.96 N), pulled on top of one another and the force needed for doing this was measured.

The following examples and comparative examples serve to explain the invention, but should not be interpreted as restrictive.

II. Materials Used

TEGO® photoinitiator A 18 is an especially suitable photoinitiator (concentration for use: 1.5-2%) for curing TEGO® RC silicones through UV rays.

TEGO® RC 702 is a solvent-free, UV cross-linkable silicon acrylate for the manufacturing release coatings with low release values.

TEGO® RC 711 is a solvent-free silicon acrylate for the release coating of paper and plastic films. It serves as adhesive promoter and component to increase the release value together with other TEGO® RC silicones. TEGO® RC 711 is a CR (controlled release) additive and adhesive promoter that has a linear structure with more than 10 but less than 20 Si units. The RC value is 0.62, density 1 g/cm$^3$ and viscosity 400-700 mPas at 25° C.

TEGO® RC 902 is a solvent-free silicon acrylate for the release coating of paper and plastic films used for achieving low release values. TEGO® RC 902 is a base polymer with initially one spacer (≥3 C atoms), then the acrylate group. It has a linear, bifunctional structure (α,β), its RC value is 0.91, density 1 g/cm$^3$ and viscosity 200-600 mPas at 25° C.

All the TEGO products named above come from Evonik Industries AG Co.

It should be observed for explanatory purposes that the RC value indicates the proportion of polysiloxane, whereas the remaining components are of organic origin (i.e. the acrylate groups). For example, the RC value of 0.91 of TEGO® RC 902 means that it contains 9% organic materials and 91% polysiloxane.

In the examples presented below (B1-B3) and in the comparative example, a mixture of 12% Durethane B40 FAM (Lanxess), which is a PA 6, and of 88% Durethan C38 F (Lanxess), a medium-viscosity copolyamide, was always used for the polyamide layer. Basically, commercially available polyamides (PA, brand names in parentheses) can be used, such as those of the companies Lanxess (Durethan, see above), BASF (Ultramid), DuPont (Zytel), DSM Engineering Plastics (Akulon, Stanyl), EMS-Chemie (Grilamid, Grivory, Grilon), Evonik (Vestamid, Trogamid), Radici (Radilon, Radiflam, Raditer, Heraform, Heraflex) Rhodia (Technyl, Stabamid), UBE, DSM (Novamid) and Atofina (Rilsan), for example.

A typically used adhesive promoter is, for example, Admer NF498E, an LDPE modified with maleic anhydride groups made by the Mitsui Co. Admer® substances are PE copolymers with maleic anhydride groups (MA groups) that adhere strongly to PET, EVOH and PA, can also be processed very well and are as thermally stable as normal PE.

Typically used polyolefins are, for example, Lupolen 2420 F, an LDPE made by the LyondellBasell Polymers Co., and Exceed 1327 CA made by the ExxonMobil Chemical Company, an ethylene copolymer manufactured by means of metallocene catalysis, in which another co-monomer is used in its polymerization apart from ethylene hexene.

The adhesives used were TESA 7476, a rubber-based adhesive, and TESA 7475, an acrylate-based adhesive.

The (release) wax Constab PE-SA 270 made with ethylene bis stearamide (EBS) made by CONSTAB Polyolefin Additives GmbH was used as migrating lipophilic compound.

III. Manufacturing of the Siliconized Tubular Films

The film of comparative example V1 is a 200-μm thick tubular film without releasing coating (i.e. release finishing) and without wax additivation used as inner tube film in trenchless sewage pipe renovation:

| Layer number | Composition | Proportion in layer in % | Thickness in μm |
|---|---|---|---|
| 1 | Durethan C38 F | 88 | 40 |
|   | Durethan B40 FAM | 12 |   |
| 2 | Adhesive promoter: Admer NF 498 E | 100 | 10 |
| 3 | Lupolen 2420 F | 70 | 65 |
|   | Exceed 1327 CA | 30 |   |
| 4 | Adhesive promoter: Admer NF 498 E | 100 | 10 |
| 5 | Lupolen 2420 F | 70 | 75 |
|   | Exceed 1327 CA | 30 |   |
|   |   | Sum: | 200 μm |

In examples B1-B3, the polyamide side of the film from comparative example V1 was coated (finished) with the following silicone or polysiloxane formulations:

Example B1: Comparative example V1 plus polysiloxane formulation 1 according to the following table (application weight AW: 1 g/m²) that allows an easy release and has an especially good release effect;

Example B2: Comparative example V1 plus polysiloxane formulation 2 according to the following table (AW: 1 g/m²) that allows a tight or controlled release and has a medium release effect;

Example B3: Comparative example V1 plus polysiloxane formulation 3 according to the following table (AW: 1 g/m²) that allows a medium release and has a good release effect.

The polysiloxane formulations (coating materials) used and their proportions are listed below:

|  | Evonik RC products Quantities in % by weight | | | |
|---|---|---|---|---|
| Example | RC902 | RC702 | RC 711 | A 18 |
| B1 |  | 100% |  |  |
| B2 |  |  | 98% | 2% |
| B3 | 59% |  | 39% | 2% |

The expert is familiarized with the necessary coating equipment, which can consist of a 5-roller coating machine, for example. Manufacturers of appropriate equipment for applying a silicon coating are, for example, Pagendarm, Polytype, Kroenert, Coatema, Bachofen+Meier or Olympia.

IV. Manufacturing of the Wax-Additivated Tubular Films

Example B4: Structure of the inner tube film: thickness 200 μm; with 1% release wax Constab PE-SA 270 (migrating additive) made from ethylene bis stearamide (EBS) in the polyamide external layer:

| Layer number | Composition | Proportion in layer in % | Thickness in μm |
|---|---|---|---|
| 1 | Durethan C38 F | 87.5 | 40 |
|   | Durethan B40 FAM | 11.5 |   |
|   | Constab PE-SA 270 | 1.0 |   |
| 2 | Adhesive promoter: Admer NF 498 E | 100 | 10 |
| 3 | Lupolen 2420 F | 70 | 65 |
|   | Exceed 1327 CA | 30 |   |
| 4 | Adhesive promoter: Admer NF 498 E | 100 | 10 |
| 5 | Lupolen 2420 F | 70 | 75 |
|   | Exceed 1327 CA | 30 |   |
|   |   | Sum: | 200 μm |

Example B5: Structure of the inner tube film: thickness 200 μm; with 4% release wax Constab PE-SA 270 made of ethylene bis stearamide (EBS) in the polyamide external layer:

| Layer number | Composition | Proportion in layer in % | Thickness in μm |
|---|---|---|---|
| 1 | Durethan C38 F | 85.5 | 40 |
|   | Durethan B40 FAM | 9.5 |   |
|   | Constab PE-SA 270 | 4.0 |   |
| 2 | Adhesive promoter: Admer NF 498 E | 100 | 10 |
| 3 | Lupolen 2420 F | 70 | 65 |
|   | Exceed 1327 CA | 30 |   |
| 4 | Adhesive promoter: Admer NF 498 E | 100 | 10 |
| 5 | Lupolen 2420 F | 70 | 75 |
|   | Exceed 1327 CA | 30 |   |
|   |   | Sum: | 200 μm |

Example B6: Structure of the inner tube film: thickness 200 μm; with 6% release wax Constab PE-SA 270 made of ethylene bis stearamide (EBS) in the polyamide external layer:

| Layer number | Composition | Proportion in layer in % | Thickness in μm |
|---|---|---|---|
| 1 | Durethan C38 F | 85.0 | 40 |
|   | Durethan B40 FAM | 9.0 |   |
|   | Constab PE-SA 270 | 6.0 |   |
| 2 | Adhesive promoter: Admer NF 498 E | 100 | 10 |
| 3 | Lupolen 2420 F | 70 | 65 |
|   | Exceed 1327 CA | 30 |   |
| 4 | Adhesive promoter: Admer NF 498 E | 100 | 10 |
| 5 | Lupolen 2420 F | 70 | 75 |
|   | Exceed 1327 CA | 30 |   |
|   |   | Sum: | 200 μm |

V. Measurement Results

1) Determination of Release Force/Adhesion

The release force necessary for removing the release film from a test adhesive tape in all release films of examples B1-B6 and of comparative example V1 was determined with the method described above. The following results were obtained:

| | Release force in cN/25 mm (tube front/back side) | | | |
|---|---|---|---|---|
| | Adhesive TESA 7476 (simulates resin's stickiness) | | Adhesive TESA 7475 | |
| Example | 1 d, 40° C. | 7 d, 40° C. | 1 d, 40° C. | 7 d, 40° C. |
| V1 | blocked | blocked | 798/772 | 796/745 |
| | Films with polysiloxane coating (silicon) | | | |
| B1 | 55/45 | 52/49 | 8/8 | 9/9 |
| B2 | 402/391 | 415/398 | 130/128 | 112/123 |
| B3 | 60/44 | 76/62 | 9/7 | 12/10 |
| | Films with wax additivation | | | |
| B4 | 753/752 | 734/736 | 823/623 | 615/610 |
| B5 | 420/419 | 415/417 | 297/299 | 290/291 |
| B6 | 405/404 | 401/405 | 278/279 | 275/275 |

Note: In the tubular films of examples B1-B6, the front and back side (or the upper and lower side) of the tube laid flat are in each case identical with regard to the coating or covering with migrating additives. The side that has the coating always faces outward in the tube. The values measured for the front side of the tube's external side and for the back side of the tube's external side are identical within the scope of measurement accuracy.

The stickiness of the resins typically used in pipe lining is largely the same as the stickiness of TESA 7476 (rubber-based adhesive) and can be estimated very well with it.

As can be seen in the table, the polysiloxane formulations of examples B1 and B3 have almost similar release force values, although the easy release polysiloxane formulation from example B1 has somewhat lower values than the medium release formulation of example B3. However, in the two adhesives tested, considerably higher release forces are found in the tight release polysiloxane formulation of example B2.

Regarding the TESA 7476 adhesive with similar resin properties, a release force range from approx. 20 cN/25 mm to approx. 550 cN/25 mm is possible by selecting the corresponding formulation for the polysiloxane coating. Therefore, the release behavior of the inner tube film, i.e. its external side, can be adjusted within a very wide range from the resin after it has been cured, going from especially "easy removal" and "moderate removal" all the way to "difficult removal". Even when the tubular films according to the invention are used as sliding films or preliner films, the reduction of the release forces is very beneficial for the application, as this is also accompanied by a lowering of the coefficient of friction (COF) and resin adhesion is therefore prevented (for more details about this, see below).

A reduction of the release forces is also seen in the tubular films according to the invention B4-B6. Compared to the film from comparative example V1, this causes the prevention of the blocking (i.e. an undesirably strong sticking against one another coupled with impossible separation) of the film with the rubber-adhesive TESA 7476 and measurable and considerably lower release forces are achieved with 753 cN/25 mm, 420 cN/25 mm and 405 cN/25 mm (values after 1 day (1 d) and 40° C. storage). The same trend is achieved with the acrylate-based adhesive TESA 7475. Compared to the film from comparative example V1, the initial value of 798 cN/25 mm therefore decreases to 623 cN/25 mm if 1% PE-SA 270 is added to the polyamide layer (example B4). With 4% PE-SA-270 in the polyamide layer, a release force of 297 cN/25 mm was determined (example B5); the continued increase of the concentration to 6% PE-SA 270 led to a release force of 278 cN/25 mm (example B6).

From looking at the measurement results of the release forces, it is also obvious that there is apparently a saturation concentration for the migrating additive. In both adhesives, there was a clear drop in the release force when up to 4% by weight of wax was successively fed into the external layer (examples B4 and B5). Meanwhile, the additional increase of the wax proportion to 6% leads only to a rather lower reduction of release force values expressed in percent (example B6 compared to examples B4 and B5 as well as with comparative example V1).

The effect of migration to the surface is facilitated by storing the film at 40° C.—as expected. Thus, the release forces in both adhesives are always somewhat lower after 7 days (7 d) than after 1 day (1 d), counting from the moment when the films are manufactured.

Although additivation with wax (release wax) in both adhesives does not quite reach the low release force level of a coating of the film with polysiloxane (B1-B3), a marked reduction of the release force and the friction values is nonetheless achieved. Consequently, the release force level—which can be adjusted when polysiloxane coatings are used in the approximate range of 20 to 550 cN/25 mm and can be expanded up to about 800 cN/25 mm, i.e. until the film starts blocking against the adhesive or resin, which allows an even broader application area of the films according to the invention, particularly when tube liners are manufactured or in the pipe lining process in trenchless sewage pipe renovation.

2. Determination of Adhesion

Furthermore, the adhesion of the coating to the external layer of the tubular films B1-B3 in question was tested with the method described above:

| Example | Adhesion of the coating to the external layer |
|---|---|
| V1 | (not available, OK) |
| B1 | Test OK |
| B2 | Test OK |
| B3 | Test OK |
| B4 | (not available, OK) |
| B5 | (not available, OK) |
| B6 | (not available, OK) |

Test OK = Test is all right (no rub-off effect)

The table shows that the polysiloxane coating from examples B1-B3 is firmly anchored to the film and cannot be rubbed off, This is especially important when the tubular film according to the invention is used as inner tube film in trenchless sewage pipe renovation because if there is insufficient bonding, residual polysiloxane could migrate into the resin and have a negative effect on its curing as a result of this.

Since the films from comparative example V1 and those from examples B4-B6 have no polysiloxane-based coating, no rub-off effect can occur there.

Thus, the curing of the resin is neither affected by the coating of the tubular film with polysiloxane nor by the addition of components migrating to the surface, where they coat it with a thin layer.

3. Determination of the Coefficients of Friction

The following coefficients of friction (COF) were measured in the tubular films of comparative example V1 and of examples B1-B6, where one external side of one film was measured against the one of another film:
Comparative example V1: mean 0.31; PA side vs. PA side;
Example B1: mean 0.25; polysiloxane-coated sides against one another;
Example B2: mean 0.27; polysiloxane-coated sides against one another;
Example B3: mean 0.245; polysiloxane-coated sides against one another;
Example B4: mean 0.24; wax-additivated sides against one another;
Example B5: mean 0.16; wax-additivated sides against one another;
Example B6: mean 0.14; wax-additivated sides against one another.

It is immediately obvious from these results that both a coating with polysiloxane (so-called siliconization) and an additivation with substances migrating to the surface reduce the coefficient of friction COF. It is in trenchless sewage pipe renovation where low COFs are always advantageous, as then the tube liners can be more easily drawn into the pipe.

4. Air Inflation Test, Splicing and Break

| Example | Initial circumference in mm | Splice in mm | Splice in % | Break in mm | Break in % |
|---|---|---|---|---|---|
| V1 | 1054 | 1222 | 15.9 | 1902 | 80.5 |
| B1 | 1044 | 1220 | 17.9 | 2050 | 96.4 |
| B2 | 1042 | 1280 | 22.8 | 2170 | 108.3 |
| B3 | 1050 | 1250 | 19.0 | 2100 | 100.0 |
| B4 | 1050 | 1229 | 17.0 | 1985 | 89.0 |
| B5 | 1052 | 1245 | 18.3 | 2016 | 91.6 |
| B6 | 1050 | 1243 | 18.4 | 2025 | 92.9 |

A surprising finding was that the elasticity until break increased significantly with coating with polysiloxane and wax additivation compared to the non-siliconized reference that was not additivated with wax from comparative example V1. In the polysiloxane-coated tubular film from example B3, the increase in elasticity until break compared to the reference from comparative example V1 is 3.1%, in example B2 even almost 7%.

Another clear improvement is also seen in the elasticity until break. Whereas comparative example V1 breaks already under an elongation of 80.5%, the polysiloxane-coated tubular film from example B1 can elongate 96.4% (15.9% more than V1), and in the case of the polysiloxane-coated tubular film from example B3 the elongation is 100.0% (19.5% more than the reference V1). The improvement of the elongation until break becomes clearest in the tubular film coated with polysiloxane from example B2, where the elongation until break is 108.3%—even 27.8% greater compared to the reference V1.

Additivation with wax also causes a noticeable increase in tubular film elasticity until film splice and film break, as the comparison of examples B4-B6 with the non-additivated film from comparative example V1 shows. Anyhow, the addition of 6% wax (example B6) increases elasticity until film splice by up to 2.5% compared to the film from comparative example V1. Film elongation until break improves by more than 12% in the film of example B6 compared to the film from comparative example V1 (in example 4: 8.5%, in example 5: 11.1%).

Siliconization in both sides of a tubular film (laid flat) significantly increases elasticity until splicing or break. Additivation with wax leads to noticeable improvements too.

A possible cause for this surprising and positive effect with regard to the mechanical properties of the tubular film according to the invention can be an additional protective effect of the external polyamide layer owing to a thin polysiloxane film (due to coating) and also to a thin wax film (due to migration to the surface). The two variants—coating with a polysiloxane ("siliconization") and wax additivation—lead to a hydrophobic, water-repellent protective layer on the external side of the tubular film.

The invention was explained using a few embodiments, but is not restricted to them. Invention variations are readily possible as part of the claims.

The invention claimed is:

1. An insertion tube for use in trenchless sewage pipe renovation, comprising:
    an opaque external tubular film that is impermeable to liquids and at least partially reflects or absorbs UV radiation or visible light of short wavelengths;
    an inner tubular film;
    a carrier material impregnated with a reactive plastic resin arranged between the external tubular film and the inner tubular film; and
    wherein the inner tubular film comprises:
        one or multiple layers
        an inner facing external side and an outer facing external side facing the carrier material;
        a coating of at least one of (1) a coating with a polysiloxane; or (2) a coating or covering with at least one migrating compound; and
    wherein the coating is applied over a section of or an entire circumferential area of the outer facing external side facing the carrier material.

2. The insertion tube according to claim 1, wherein the coating is applied to a section of the circumferential area of the outer facing external side as continuous or interrupted stripes, or continuously covering laying edges running along the tubular film.

3. The insertion tube according to claim 1, the inner tubular film further comprising a layer that contains a thermoplastic elastomer (TPE) within a range of more than 20% by weight up to 100% by weight.

4. The insertion tube according to claim 1, wherein the inner tubular film has a total thickness between 10 µm and 5000 µm.

5. The insertion tube according to claim 1, the inner tubular film further comprising at least one internal layer in the form of an adhesion promoter layer, wherein at least one of the external layers comprising the coating, and wherein:
    one of the external layers has at least one homo- and/or copolyamide and the other external layer has at least one thermoplastic olefin homo- or copolymer with a proportion by weight expressed in percent of more than 25% by weight, or
    both external layers contain at least one thermoplastic olefin homo- or copolymer, and there is one internal layer containing a homo and/or copolyamide with a proportion by weight expressed in percent of more than 25% by weight.

6. The insertion tube according to claim 5, the inner tubular film further comprising an additional internal layer comprising one of:
    an EVOH layer;
    a barrier material against oxygen, water vapor, or oil; or a thermoplastic homo and/or copolymer of polyethylene homopolymer (PE), LDPE, HDPE, or a polypropylene homopolymer (PP).

7. The insertion tube tubular film according to claim 5, wherein the coating has a thickness no more than 15 μm.

8. The insertion tube according to claim 1, wherein the polysiloxane is a cross-linked, polysiloxane, selected from among the group that encompasses addition cross-linked, metal-catalyzed addition cross-linked, condensation cross-linked, radical cross-linked, cation cross-linked and humidity cross-linked polysiloxanes.

9. The insertion tube according to claim 8, wherein the polysiloxane is copolymerized with monomers that do not contain silicon.

10. The insertion tube according to claim 1, wherein the coating is a coating or covering with at least one migrating compound, and the migrating compound is one of: (1) a lipophilic compound from the group of a wax, paraffin, fatty acid, or a fat, or (2) a hydrophilic compound from the group of a polyether, polyester, an alcohol with at least one hydroxyl group, ethylene glycol, polyethylene glycol, polypropylene glycol, propanediol, butanediol, pentanediol, hexanediol or glycerin.

11. The insertion tube according to claim 10, wherein the migrating lipophilic or hydrophilic compound is added to an external side containing a thermoplastic olefin homo- or copolymer or a homo- or copolyamide.

12. The insertion tube according to claim 10, wherein the migrating lipophilic or hydrophilic compound has a proportion of at least 1% by weight of a respective layer in which it is contained.

13. The insertion tube according to claim 12, wherein the migrating lipophilic or hydrophilic compound is one of:
- a short-chain compound or an oligomer with 1 to 50 carbon atoms;
- an inorganic compound (with 1 to 500 silicon atoms) or a (sheet) silicate; or
- a shorter-chained polymer with 50 to 20.000 carbon atoms.

* * * * *